United States Patent
Yankevich et al.

(10) Patent No.: US 11,137,475 B2
(45) Date of Patent: Oct. 5, 2021

(54) PSEUDO LOW IF FOR ZERO IF RECEIVER TO REDUCE DYNAMIC FREQUENCY SELECTION (DFS) FALSING

(71) Applicant: Cisco Technology, Inc., San Jose, CA (US)

(72) Inventors: Evgeny Yankevich, Beachwood, OH (US); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 272 days.

(21) Appl. No.: 16/151,466

(22) Filed: Oct. 4, 2018

(65) Prior Publication Data

US 2020/0110152 A1    Apr. 9, 2020

(51) Int. Cl.
*G01S 7/02* (2006.01)
*H04W 72/04* (2009.01)
*H04L 25/03* (2006.01)

(52) U.S. Cl.
CPC ........ *G01S 7/021* (2013.01); *H04L 25/03159* (2013.01); *H04W 72/0453* (2013.01); *H04L 2025/03375* (2013.01)

(58) Field of Classification Search
CPC .......... G01S 13/24; G01S 13/26; G01S 7/006; G01S 7/021; G01S 7/03; G01S 7/2921; H04B 1/0007; H04B 1/30; H04L 2025/03375; H04L 25/03159; H04W 72/0453
See application file for complete search history.

(56) References Cited

U.S. PATENT DOCUMENTS

| | | | |
|---|---|---|---|
| 7,259,716 B1 * | 8/2007 | Dubbert | G01S 7/28 342/131 |
| 9,143,370 B2 | 9/2015 | Gao et al. | |
| 2004/0157580 A1 * | 8/2004 | Stadelmeier | H04W 16/14 455/338 |
| 2007/0105505 A1 * | 5/2007 | Crocker | H04B 7/12 455/78 |
| 2010/0130156 A1 | 5/2010 | Jin et al. | |
| 2016/0077134 A1 * | 3/2016 | Rezk | G01S 7/021 324/76.39 |
| 2016/0099784 A1 * | 4/2016 | Bratfisch | H04B 17/23 375/228 |

OTHER PUBLICATIONS

Ajay Balankutty, et al., "A 0.6-V Zero-IF/Low-IF Receiver With Integrated Fractional-N Synthesizer for 2.4-GHz ISM-Bland Applications", IEEE Journal of Solid-State Circuits, vol. 45, No. 3, Mar. 2010, 16 pages.

(Continued)

*Primary Examiner* — Timothy A Brainard
(74) *Attorney, Agent, or Firm* — Edell, Shapiro & Finnan, LLC

(57) ABSTRACT

A pseudo low intermediate frequency (IF) configuration is provided for a receiver having a zero IF radio architecture dedicated for radar detection, in order to reduce false radar detection. Energy from local oscillator leakage is shifted away from DC. After filtering out of the desired subchannel, the local oscillator leakage energy is suppressed, reducing false radar detection.

20 Claims, 9 Drawing Sheets

(56) References Cited

OTHER PUBLICATIONS

Anup Savla, et al., "A Reconfigurable Low IF-Zero IF Receiver Architecture for Multi-Standard Wide Area Wireless Networks", 10th IEEE International Conference on Electronics, Circuits and Systems, 2003. ICECS 2003. Proceedings of the 2003, Dec. 2003, 4 pages.

Heinz Mathis, "Architecture combines low- and zero-IF receivers", Institute for Communication Systems, University of Applied Sciences, Aug. 26, 2010, 6 pages.

* cited by examiner

FIG. 7A
CAPTURE LOW-IF WITH 1MHz OFFSET FROM SERVICE CHANNEL DC

FIG. 7B
ALIGN DCs TO SERVICE CHANNEL DC

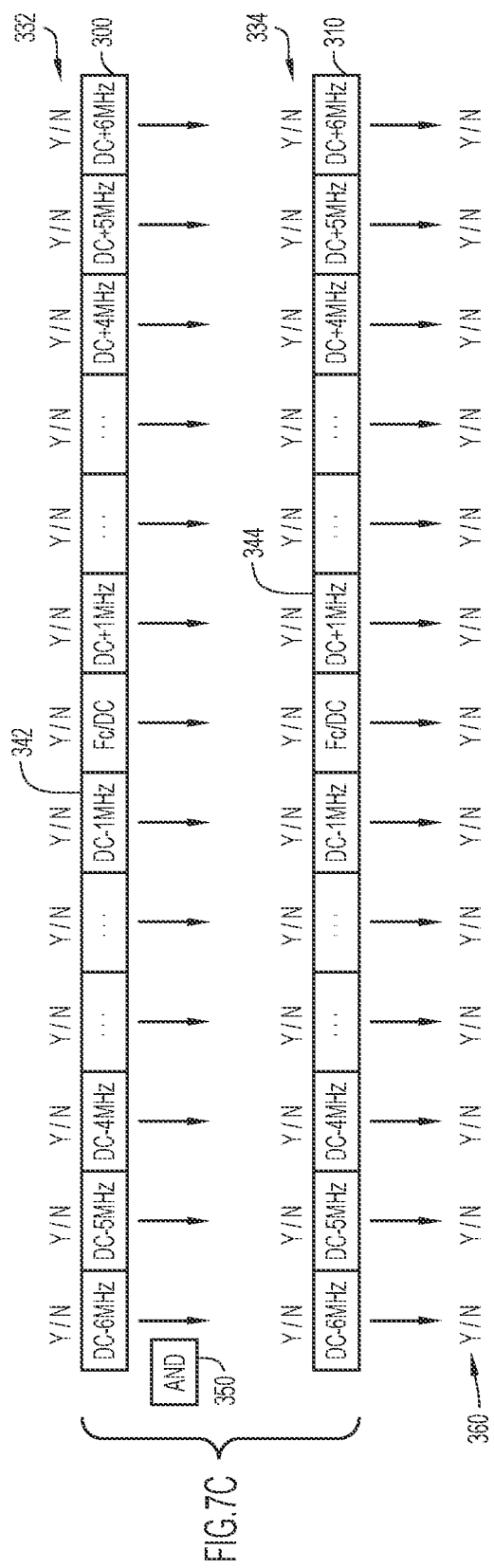

400

410 — SERVING WIRELESS NETWORK TRAFFIC IN A WIRELESS NETWORK WITH A SERVING RADIO TRANSCEIVER OPERATING WITHIN A SERVICE CHANNEL HAVING A CHANNEL BANDWIDTH

420 — RECEIVING ENERGY WITH A MONITOR RADIO RECEIVER

430 — CONTROLLING THE MONITOR RADIO RECEIVER SO THAT THE SERVICE CHANNEL OF THE SERVICE RADIO TRANSCEIVER OCCUPIES ONE OF MULTIPLE SUB-CHANNELS WITHIN THE BANDWIDTH OF THE FREQUENCY BAND COVERAGE OF THE MONITOR RADIO RECEIVER

440 — FILTERING A RECEIVED SIGNAL PRODUCED BY THE MONITOR RADIO RECEIVER TO PRODUCE A FILTERED RECEIVED SIGNAL

450 — CONVERTING THE FILTERED RECEIVED SIGNAL TO RECEIVED DIGITAL DATA

460 — DIGITALLY DOWNCONVERTING THE RECEIVED DIGITAL DATA TO BASEBAND TO PROVIDE BASEBAND DIGITAL DATA FREE OF ANY DC LEAKAGE ASSOCIATED WITH A LOCAL OSCILLATOR OF THE MONITOR RADIO RECEIVER

470 — DETERMINING WHETHER RADAR IS PRESENT IN THE SERVICE CHANNEL BASED ON THE BASEBAND DIGITAL DATA

FIG.8

PSEUDO LOW IF FOR ZERO IF RECEIVER TO REDUCE DYNAMIC FREQUENCY SELECTION (DFS) FALSING

TECHNICAL FIELD

The present disclosure relates to wireless communication systems.

BACKGROUND

Radar detection is the majority use of 5 GHz frequency channels in the United States. Dynamic Frequency Selection (DFS) is a mechanism that allows unlicensed devices to share the 5 GHz frequency bands with radar systems without causing interference to the radar systems. In a Wi-Fi® access point (AP) device, a DFS detector "listens" within the same channel bandwidth as the Wi-Fi service channel to detect radar.

BRIEF DESCRIPTION OF THE DRAWINGS

FIGS. 7A-7C are diagrams showing frequency bins of first and second downconverted signals as part of the radar detection process, according to an example embodiment.

FIG. 8 is a flow chart depicting the overall operations of the radar detection process, according to an example embodiment.

DESCRIPTION OF EXAMPLE EMBODIMENTS

Overview

In one embodiment, a serving radio transceiver of a communication device, such as an access point, operates within a service channel having a bandwidth in order to serve wireless network traffic in a wireless network. Energy is received with a monitor radio receiver of the communication device. The monitor radio receiver is tuned/controlled so that the service channel of the service radio transceiver occupies one of multiple sub-channels within a bandwidth of a frequency band coverage of the monitor radio receiver. A received signal produced by the monitor radio receiver is filtered with a filter to produce a filtered received signal. The filtered received signal is converted to received digital data. The received digital data is digitally downconverted to baseband to provide baseband digital data free of any DC leakage associated with a local oscillator of the monitor radio receiver. The communication device determines whether radar is present in the service channel based on the baseband digital data.

Example Embodiments

A zero intermediate frequency (IF) (zero IF) receiver is a common receiver configuration and it is used in numerous Wi-Fi access points due to its simplicity. When a radar signal is transmitted at DC (middle of a channel), detection of this signal becomes difficult for a zero IF receiver. This is because a radar pulse at DC is represented by a certain DC level above thermal noise. A problem with a zero IF configuration is that energy of a local oscillator (LO) that leaks through a mixer/demodulator is also translated to DC at baseband. Such LO leakage cannot be separated from the desired signal, and this may cause a false Dynamic Frequency Selection (radar) detection. Averaging and subtracting estimated DC value from the received signal does not result in a stable DFS detection due to the variation of DC level for different pulse durations and for different LO contributions for different gain values and temperatures.

In accordance with one embodiment, presented herein is a pseudo low IF configuration for a receiver having a zero IF radio architecture dedicated for radar detection. This reduces false radar detection.

Figure 1:
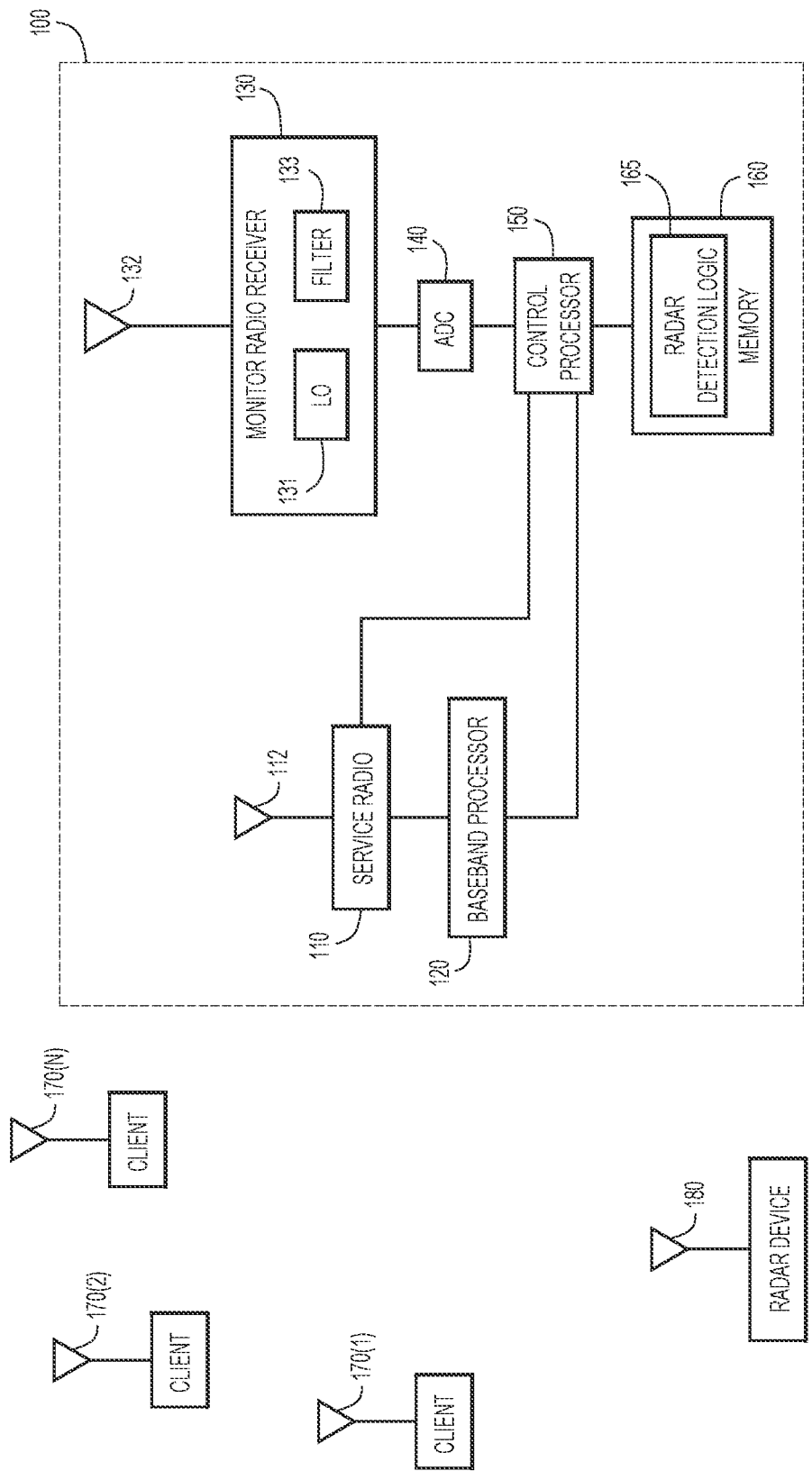
FIG. 1 is a block diagram of a wireless communication device configured to reduce falsing of radar detection in DFS channels, according to an example embodiment.

Referring first to FIG. 1, a block diagram is shown of a communication device 100 configured to invoke a pseudo low IF configuration for a zero IF receiver to reduce false radar detection. The communication device 100 may be, for example, an access point (AP) configured to operate in an unlicensed band. The communication device 100 includes a service radio transceiver 110 coupled to at least one antenna 112 and a baseband processor (e.g., modem/PHY) 120. The service radio transceiver 110 and baseband processor 120 may be configured to operate in accordance with the IEEE 802.11/Wi-Fi® wireless local area network (WLAN) standards or in accordance with any standard or configuration that may involve wireless radio frequency (RF) communications in a frequency band that is to be shared with a preemptive user, such as radar devices/systems, in the 5 GHz frequency channels in the United States.

In addition, the communication device 100 includes a monitor radio receiver 130 that includes a local oscillator (LO) 131 and a filter 133. The monitor radio receiver 130 is connected to an antenna 132. The filter 133 is configured to filter a received signal produced by the monitor radio receiver 130. The monitor radio receiver 130 is coupled to an analog-to-digital converter (ADC) 140. The ADC 140 converts the filtered analog received signal produced by the monitor radio receiver 130 to a digital signal. In one form, the filter 133 is a passband filter having a passband corresponding to the bandwidth of the service channel. In another pseudo low IF implementation, the filter 133 is a low pass filter, and then the desired frequency bandwidth portion is downconverted and converted to digital data where it is low pass filtered again to filter the DC. Still another pseudo low IF implementation is one in which the filter 133 is a low pass filter in the analog domain, and then the desired frequency bandwidth portion is downconverted and converted to digital data where it is bandpass filtered in the digital domain.

A control processor 150 is coupled to the ADC 140 and to the service radio 110 and the baseband processor 120. The control processor 150 may be a microprocessor or microcontroller, and is coupled to a memory 160 that stores executable instructions (software) that are executed by the control processor 150 to perform various control operations for the communication device 100. For example, the memory 160 stores instructions for radar detection logic 165. The operations of the control processor 150 in executing the radar detection logic 160 are described in more detail hereinafter.

The memory 160 may be read only memory (ROM), random access memory (RAM), magnetic disk storage media devices, optical storage media devices, flash memory devices, electrical, optical, or other physical/tangible memory storage devices. Thus, in general, the memory 160 may be one or more tangible (non-transitory) computer readable storage media (e.g., a memory device) encoded with software comprising computer executable instructions and when the software is executed (by the control processor 150) it is operable to perform the operations described herein.

While the solution is described herein with respect to a separate radio receiver, the monitor radio receiver 130, this is only an example. It is possible that this solution could be applied to the service radio transceiver 110.

The communication device 100 may serve wireless network traffic, using the service radio transceiver 110 and the baseband processor 120, for one or more wireless client devices, shown at 170(1)-170(N). However, it is also possible that a radar device 180 may be in proximity to the operation of the wireless network in which the communication device 100 and client devices 170(1)-170(N) operate, and as a result, the radar emissions from radar device 180 would need to be detected so that the communication device 100 can adjust its operational behavior accordingly, e.g., by changing a channel of operation. In other words, the control processor 150 can use the knowledge about radar detection in a particular DFS channel in order to control the service radio transceiver 110 to change to a different channel for purposes of serving wireless network traffic with one or more of the wireless client devices 170(1)-170(N).

In one example, the service radio 110 is a Wi-Fi serving radio with channel bandwidth W and the monitor radio receiver 130 is a zero IF Dynamic Frequency Selection (DFS) receiver. A solution is presented herein for reducing DFS false detection at DC by extending the bandwidth of the monitor radio receiver to N×W (where N is at least 2) so that the service channel of the service radio 110 is above or below a local oscillator (LO) frequency of the monitor radio receiver 130. In this way, the monitor radio receiver 130 operates in a pseudo low IF configuration.

In the pseudo low IF configuration, the monitor radio receiver 130 is tuned/controlled so that the service channel used by the service radio 110 occupies one of several covered sub-channels within the N×W frequency bandwidth coverage of the monitor radio receiver 130. By applying proper filtering followed by digital down-conversion, DC leak typical for analog direct conversion to baseband, is prevented. These pseudo low IF configurations can also be used for signal analysis in the other portions of spectrum of bandwidth W. Moreover, it can be used for a permanently occupied bandwidth or a staggered bandwidth. In one example, the service channel is 20 MHz and the bandwidth of the monitor radio receiver 130 is 40 MHz or 80 MHz.

Figure 2:
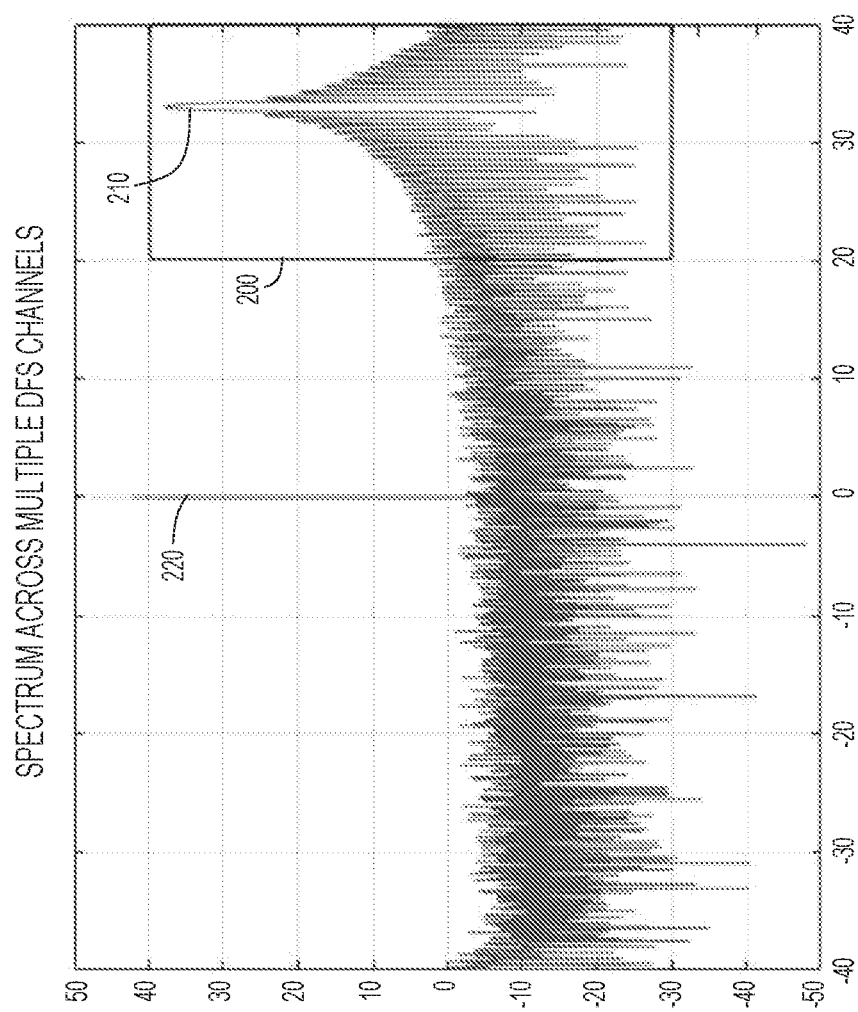
FIGS. 2-4 are diagrams showing how the radar detection process reduces or eliminates falsing of radar detection using pseudo low intermediate frequency (IF) receiver techniques, according to an example embodiment.
Figure 3:
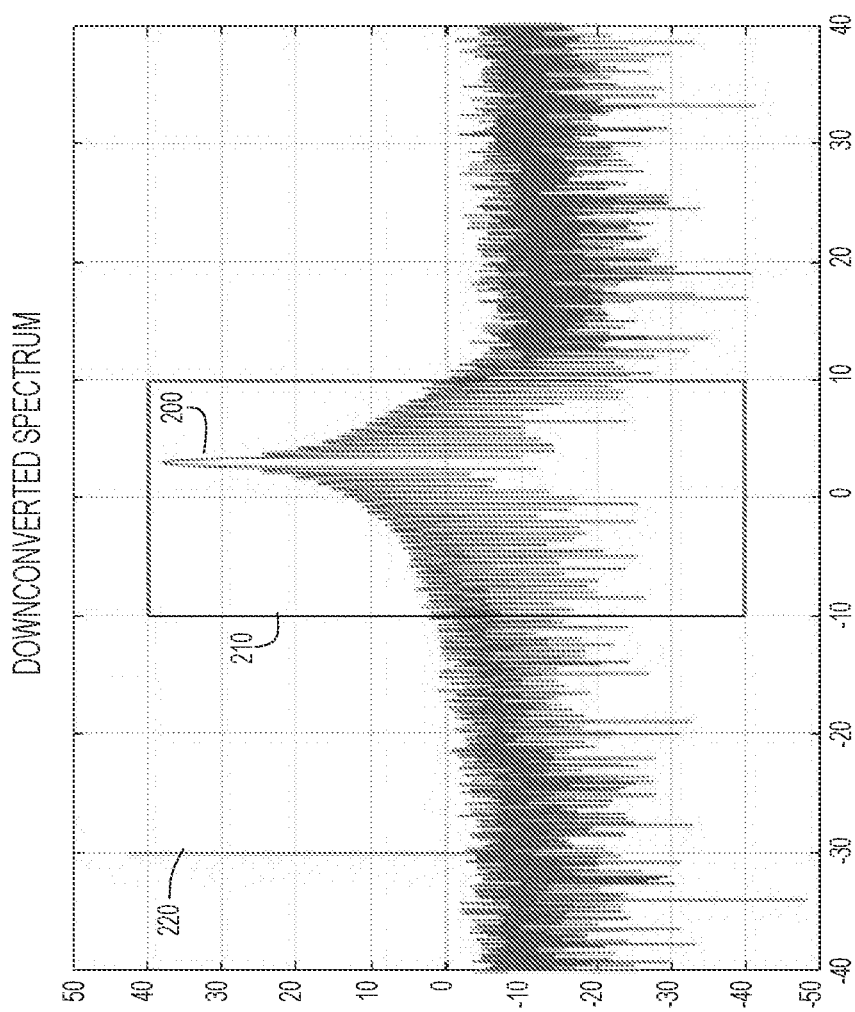
Figure 4:
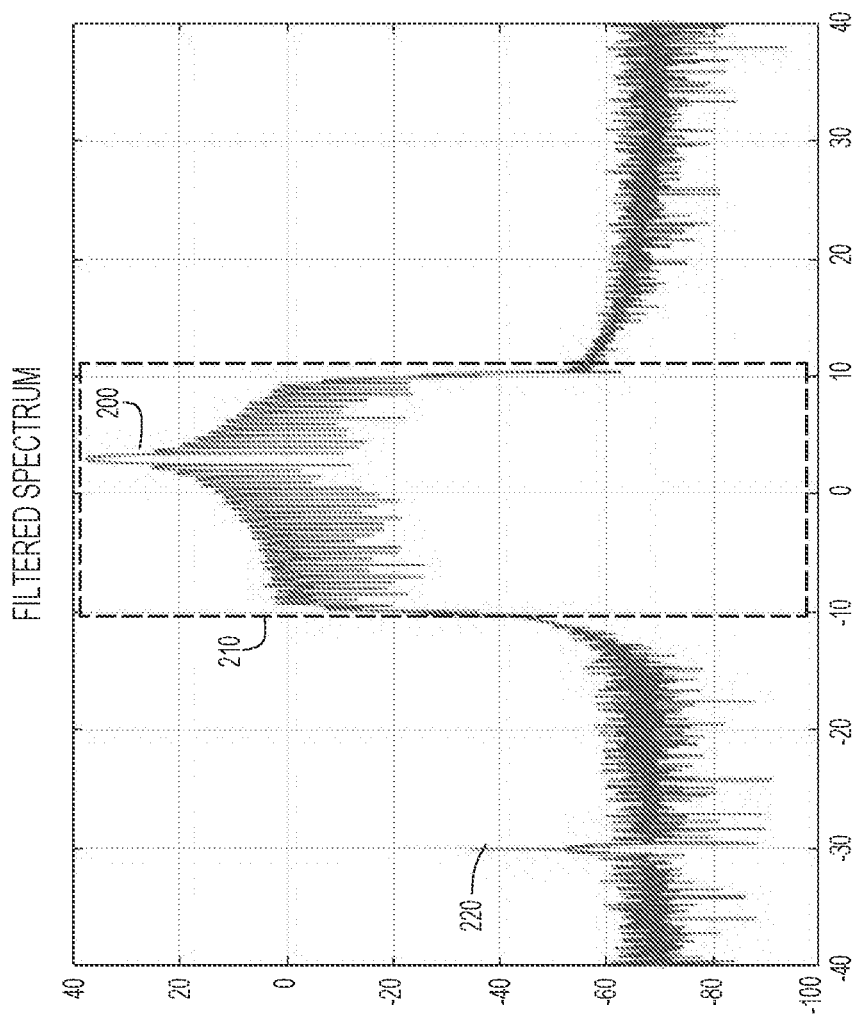

Turning now to FIGS. 2-4, the radar detection process is further described. FIG. 2 shows spectrum across multiple DFS frequency channels (called sub-channels). A radar signal (pulse) is shown at 200 in a 20 MHz frequency channel (sub-channel) 210 between 20 MHz and 40 MHz. Energy associated with a LO leakage is shown at 220 (at or near DC).

FIG. 3 shows the same spectrum of FIG. 2, after down-conversion, using the techniques presented herein. The energy from the LO leakage 220 is shifted down to −30 MHz, and the radar 200 is between DC and 10 MHz, well outside of the desired sub-channel. Prior to downconversion, the received signal may have been filtered with a passband filter having a bandwidth corresponding to the bandwidth of the service channel, or filtered with a low pass filter so that the downconversion is performed on a desired frequency bandwidth portion (less than a cutoff frequency of the low pass filter) for subsequent conversion to digital data and digital low pass filtering or digital bandpass filtering.

FIG. 4 shows the spectrum that results after filtering out all the energy except for the desired sub-channel. As shown in FIG. 4, after filtering out of the desired sub-channel, the strong LO leakage energy is suppressed, reducing chances of a false radar detection. This filtering may be performed in the digital domain with a digital low pass filter function or with a digital bandpass filter function, as described above in connection with FIG. 1.

Figure 5:
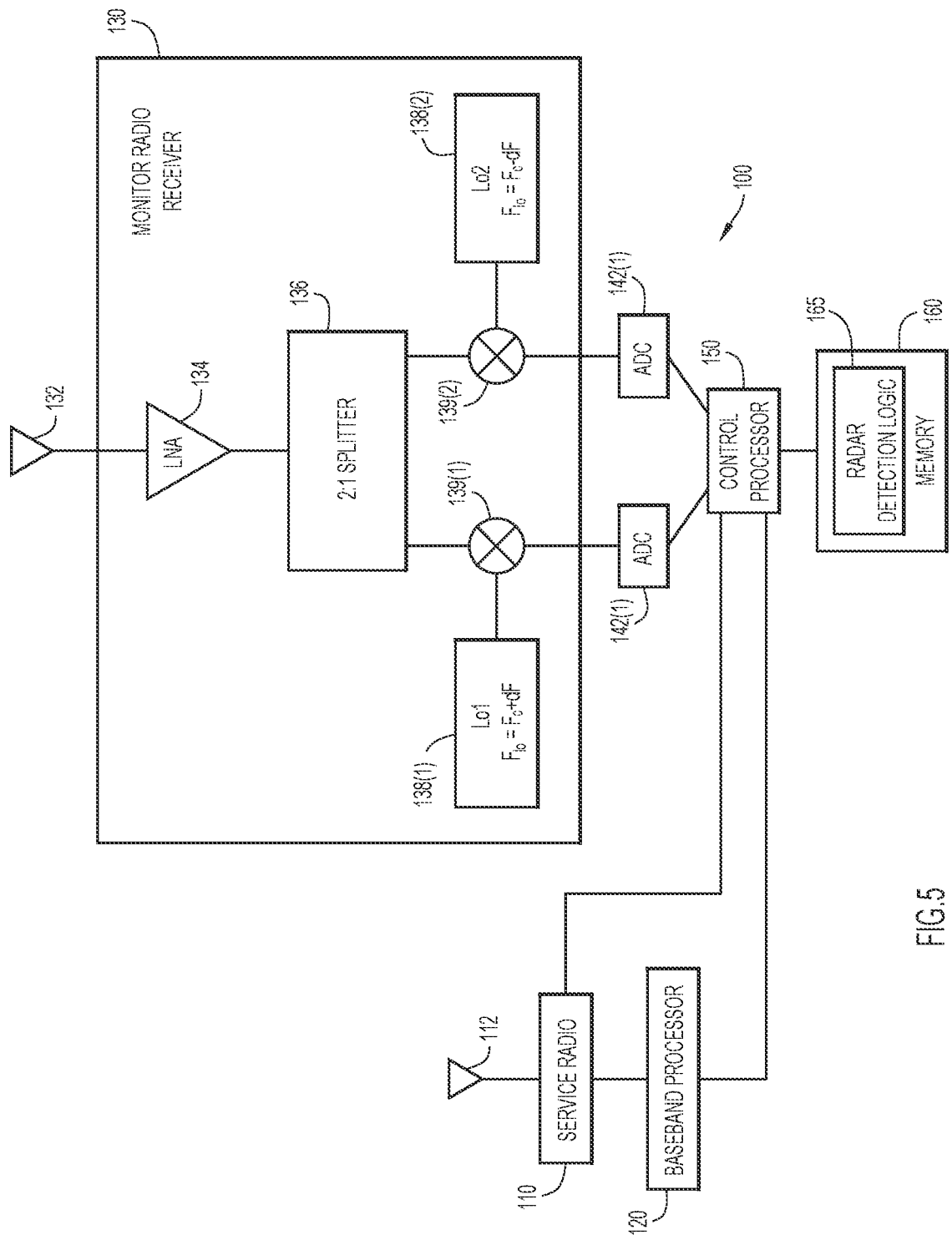
FIG. 5 is a block diagram of a wireless communication device configured to reduce falsing of radar detection in DFS channels, according to another example embodiment.

Reference is now made to FIG. 5. FIG. 5 is similar to FIG. 1, except that it illustrates a variation of the monitor radio receiver, shown at reference numeral 130' of the communication device 100, and related signal processing of the output from the monitor radio receiver 130'.

The monitor radio receiver 130' may include a low noise amplifier (LNA) 134, a 2:1 splitter 136, and two down-mixing paths at the output of the splitter 136. A first down-mixing path includes a first local oscillator (LO1) 138(1) and a first mixer 139(1). A second down-mixing path includes a second local oscillator (LO2) 138(2) and a second mixer 139(2). In one variation to the architecture shown in FIG. 1, the monitor radio receiver 130' may include two antennas and two LNAs instead of the 2:1 splitter 136 and the outputs from the two LNAs would be inputs to the first and second mixing paths, respectively.

An output of the first mixing path is coupled to a first analog-to-digital converter (ADC) 142(1) and an output of the second mixing path is coupled to a second ADC 142(2). The outputs of the ADCs 142(1) and 142(2) are coupled to the control processor 150.

The monitor radio receiver 130' shown in FIG. 5 is a dual channel/path receiver insofar as it creates two (e.g., 2×20 MHz) shifted channels/paths. The DC level is compared (with an AND operation) in frequency bins in only an overlapping portion of frequency spectrum between these two channels/paths. The frequency bins may have a 1 MHz resolution. This is to be consistent with certain regulatory requirements, such as the Federal Communication Commission in the U.S. which checks radar detection BW with a 1 MHz increment.

To this end, the first local oscillator 138(1) is configured to be at a frequency $F_{lo}$=Fc+dF, and the second local oscillator 138(2) is configured to be at a frequency $F_{lo}$=Fc−dF, where Fc is the center frequency of a channel/bandwidth of interest (e.g., DFS sub-channel) to be monitored and dF is a predetermined delta or frequency offset value. Again, in one example, dF is 1 MHz.

In operation, the LNA 134 amplifies RF energy detected by the antenna 132 and supplies the resulting amplified RF received signal to the splitter 136. The splitter 136 splits the RF received signal so that a copy of it is coupled to the first mixer 139(1) in the first mixing path and another copy of it is coupled to the second mixer 139(2) in the second mixing path. The first mixer 139(1) down-mixes the RF received signal with a first local oscillator signal at Fc+dF. Similarly, the second mixer 139(2) down-mixes the RF received signal with a second local oscillator signal at Fc−dF. The output of the first mixer 139(2) is a first received signal and the output of the second mixer 162 is a second received signal. The ADC 142(1) converts the first received signal to digital data and the ADC 142(2) converts the second received signal to digital data.

Figure 6:
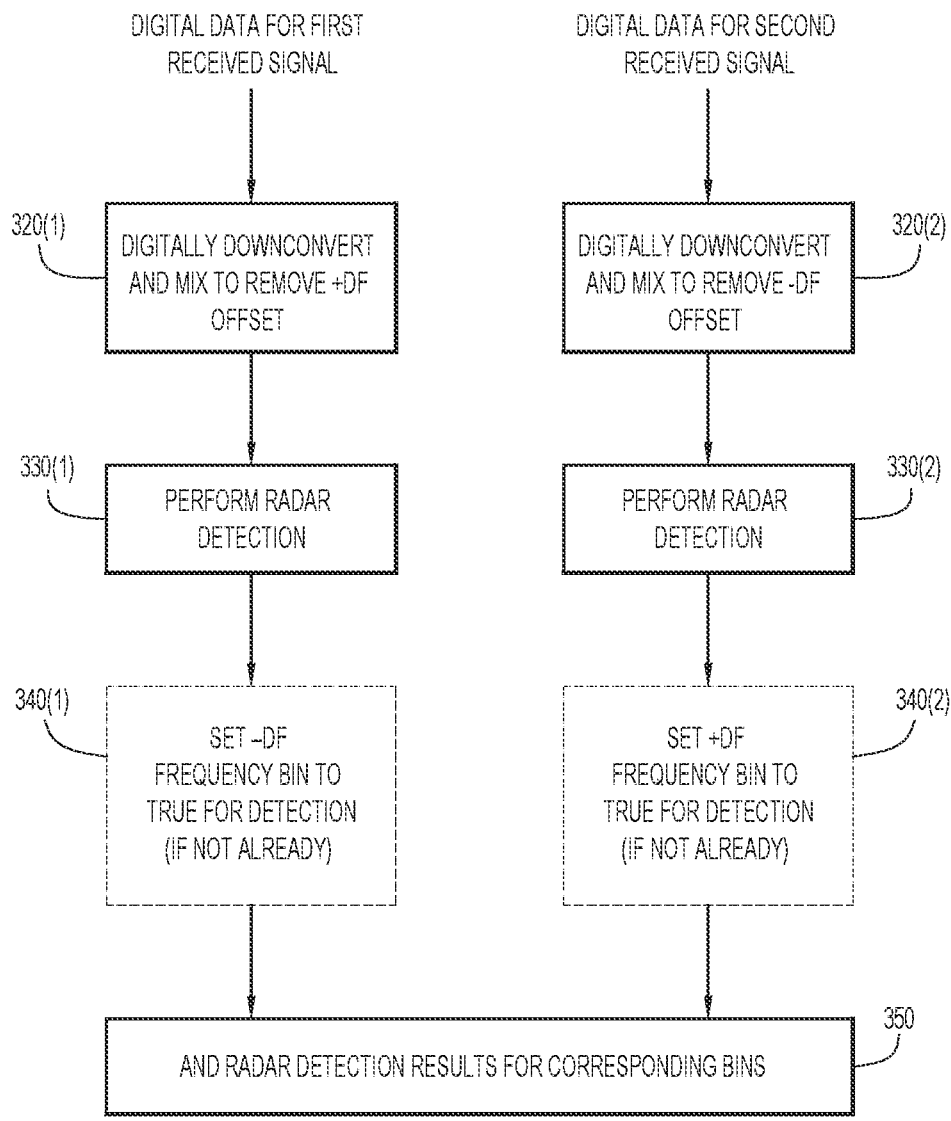
FIG. 6 is a flowchart illustrating signal processing of a radar detection process used in the embodiment of FIG. 5, according to an example embodiment.

Reference is now made to FIGS. 6 and 7A-7C, with continued reference to FIG. 1. The control processor 150 performs radar detection operations on the digital data for the first received signal and the second received signal by executing the instructions for the radar detection logic 165. The radar detection operations are depicted in FIG. 6.

FIG. 7A shows 1 MHz frequency bins representing the digital data for the first received signal at 300 and for the second received signal at 310. As shown in FIG. 7A, the first received signal 300 is offset by +dF from DC and the second received signal 310 is offset by −dF from DC.

As shown in FIG. 6, similar operations are performed for each of the first received signal and the second received signal. At 320(1) and 320(2), each of the first received signal and second received signal are digitally downconverted (down-mixed) to remove the "dF" offset. The resulting spectrums of the first and second received signals after operations 320(1) and 320(2) are shown in FIG. 7B, where the first received signal 300 is moved to the left by 1 MHz and the second received signal 310 is moved to the right by 1 MHz so that the service channel DC (Fc/DC) bins for each of the first and second received signals are aligned.

Next, radar detection is performed at 330(1) and 330(2) for the first and second received signals (now at baseband). This is shown in FIG. 7C. Specifically, the signal level at each bin is compared to a threshold, and if it is greater than a threshold, a radar detection indicator value (e.g., bit) is set. Thus, the "Y/N" above each bin for the first received signal 300 means Y if the signal level for that bin is above the threshold and N if the signal level for that bin is not above the threshold. Y may be indicated by a logic "1" and N may be indicated by a logic "0". This is shown at 332 for each frequency bin of the first received signal 300, and at 334 for each frequency bin of the second received signal 310.

Turning back to FIG. 6, at 340(1) and 340(2), an optional operation may be performed. This operation involves setting the −dF frequency bin to True (Y) for radar detection (if it was not already set in operations 330(1) and 330(2). These two bins are shown at 342 and 344 in FIG. 7C for the first and second received signals, respectively.

Next, at operation 350, the radar detection results 332 and 334 for corresponding bins of the first received signal and the second receive signal are ANDed to provide a final radar detection result for that frequency bin. This AND operation is shown in FIG. 7C, and the results of the AND operation are shown at 360 for corresponding bins of the first and second received signals. The AND result is "Y" or "1" if the radar detection results for both corresponding bins of the first and second received signals is "Y" or "1", and otherwise the result is "N" or "0". In other words, if radar is detected on the received signals for both mixing paths in the same frequency bin, it is counted as a radar detection. Otherwise, the result is discarded. Ultimately, radar is determined to be present in the frequency channel when one or more corresponding frequency bins of the first received signal and the second received signal are determined to have a signal level indicative of presence of radar.

To summarize, the first and second mixing paths shown in FIG. 5 mix down to Fc plus a slight offset (+dF) and down to Fc minus slight offset (−dF). The DC term is thereby placed in in some location (bin) but not overlapping in the same frequency bin. This is shown in FIG. 7A, where the frequency bin Fc/DC for the first received signal 300 is not aligned with the Fc/DC bin for the second received signal 310.

Referring back to FIG. 5, when the frequency of LO1 produced by the first local oscillator 138(1) is increased and the frequency of LO2 produced by the second local oscillator 138(2) is decreased, the overlapping region of the resulting first and second received signals (as depicted in FIG. 7A) shrinks. When the overlapping region is zero/null, then these operations depicted in FIGS. 6 and 7A-7C transforms into the pseudo low IF operation depicted in FIGS. 1 and 2-4, and the second mixing path of the monitor radio receiver is not needed. It can be implemented using one mixing path having a bandwidth of =2×W (the service channel bandwidth), and filtering out the DC component.

Reference is now made to FIG. 8. FIG. 8 shows a flow chart of a radar detection method 400 according to an example embodiment. At 410, wireless network traffic in a wireless network is served with a serving radio transceiver operating within a service channel having a channel bandwidth. At 420, energy is received with a monitor radio receiver in a frequency band having a bandwidth that is a multiple of the channel bandwidth of the serving radio transceiver. At 430, the monitor radio receiver is tuned/controlled so that the service channel of the service radio transceiver occupies one of multiple sub-channels within the bandwidth of the frequency band coverage of the monitor radio receiver. At 440, a received signal produced by the monitor radio receiver is filtered (in the analog domain) to produce a filtered received signal. As explained above, the filtering may be performed using a passband filter having a passband corresponding to the bandwidth of the service channel or a low pass filter. At 450, the filtered received signal is converted to received digital data. At 460, the received digital data is digitally downconverted to baseband to provide baseband digital data free of any DC leakage associated with a local oscillator of the monitor radio receiver. At 470, a determination is made as to whether radar is present in the service channel based on the baseband digital data.

As explained above, the bandwidth of the frequency band of the monitor radio receiver is at least twice the channel bandwidth of the serving radio transceiver. The service channel may correspond to (be) a Dynamic Frequency Selection sub-channel in which a radar device may operate. The service radio transceiver may be controlled based on the determination made in operation 470.

As explained above in connection with FIGS. 5-7C, the receiving operation 420 may involve downconverting received energy with a first local oscillator signal at a center frequency of a frequency channel plus a frequency offset value so as to produce a first received signal and downconverting the received energy with a second local oscillator signal at the center frequency of the frequency channel minus the frequency offset value to produce a second received signal. The converting operation 450 may involve converting the first received signal and the second received signal to digital data comprised of frequency bins that span a bandwidth of the respective first received signal and the second received signal. The digital downconverting operation may involve aligning the frequency bins of the first received signal with the frequency bins of the second low received signal so that a frequency bin at the center frequency of the first received signal is aligned with a frequency bin at the center frequency of the second received signal. Finally, the determining operation 470 may involve first evaluating signal level in frequency bins of the first received signal to determine if radar is present in any frequency bin of the first received signal, second evaluating signal level in frequency bins of the second received signal to determine if radar is present in any frequency bin of the second received signal, and generating an indication that radar is present in the service channel when one or more corresponding frequency bins of the first received signal and the second received signal are determined to have a signal level indicative of presence of radar.

In summary, a pseudo low IF configuration is provided for a zero IF receiver architecture, that eliminates DFS false detection (of radar) at DC.

In one form, a method is provided including: serving wireless network traffic in a wireless network with a serving radio transceiver operating within a service channel having a bandwidth; receiving energy with a monitor radio receiver; controlling the monitor radio receiver so that the service channel of the service radio transceiver occupies one of multiple sub-channels within a bandwidth of a frequency band coverage of the monitor radio receiver; filtering a received signal produced by the monitor radio receiver to produce a filtered received signal; converting the filtered received signal to received digital data; digitally downconverting the received digital data to baseband to provide baseband digital data free of any DC leakage associated with a local oscillator of the monitor radio receiver; and determining whether radar is present in the service channel based on the baseband digital data. The service radio transceiver may be controlled (e.g., as to which service channel to use) based on the determining operation.

In one form, the bandwidth of the frequency band coverage of the monitor radio receiver may be at least twice the bandwidth of the serving radio transceiver. In another form, the bandwidth of the frequency band coverage of the monitor radio receiver is equal to at least the bandwidth of the service radio transceiver plus twice a frequency offset value.

The filtering operation may include at least one of: filtering the received signal with a passband filter having a passband corresponding to the bandwidth of the service channel; filtering the received signal with a low pass filter so that the downconverting is performed on a desired frequency bandwidth portion for converting to digital data for subsequent digital low pass filtering; or filtering the received signal with a low pass filter so that the downconverting is performed on a desired frequency bandwidth portion for converting to digital data and subsequent digital bandpass filtering of the digital data.

The receiving operation may include downconverting received energy with a first local oscillator signal at a center frequency of a frequency channel plus a frequency offset value so as to produce a first received signal and downconverting the received energy with a second local oscillator signal at the center frequency of the frequency channel minus the frequency offset value to produce a second received signal. The converting operation may include converting the first received signal and the second received signal to digital data comprised of frequency bins that span a bandwidth of the respective first received signal and the second received signal. The digital downconverting operation may include aligning the frequency bins of the first received signal with the frequency bins of the second low received signal so that a frequency bin at the center frequency of the first received signal is aligned with a frequency bin at the center frequency of the second received signal. The determining operation may include: first evaluating signal level in frequency bins of the first received signal to determine if radar is present in any frequency bin of the first received signal; second evaluating signal level in frequency bins of the second received signal to determine if radar is present in any frequency bin of the second received signal; and generating an indication that radar is present in the service channel when one or more corresponding frequency bins of the first received signal and the second received signal are determined to have a signal level indicative of presence of radar. The operation of generating an indication that radar is present may include performing a logical AND operation of indicators for corresponding frequency bins of the first received signal and the second received signal.

Prior to the determining that radar is present in the frequency channel, the method may further include: setting the frequency bin corresponding to DC minus the frequency offset value of the first received signal to an indication of radar detection; and setting the frequency bin corresponding to DC plus the frequency offset value of the second received signal to an indication of radar detection.

The first evaluating may include setting an indicator to positive for a given frequency bin of the first received signal when the signal level in the given frequency bin of the first received signal is greater than a threshold, and the second evaluating may include setting an indicator to positive for a given frequency bin of the second received signal when the signal level in the given frequency bin of the second received signal is greater than a threshold.

In still another form, an apparatus is provided including: a serving radio transceiver configured to operate within a service channel having a bandwidth in order to serve wireless network traffic in a wireless network; a monitor radio receiver configured to receive energy in a frequency band; a filter configured to filter a received signal produced by the monitor radio receiver to produce a filtered received signal; an analog-to-digital converter configured to convert the filtered received signal to received digital data; a control processor coupled to the serving radio transceiver and the monitor radio receiver, wherein the control processor is configured to: digitally downconvert the received digital data to baseband to provide baseband digital data free of any DC leakage associated with a local oscillator of the monitor radio receiver; and determine whether radar is present in the service channel based on the baseband digital data.

In still another form, one or more non-transitory computer readable storage media are provided, encoded with instructions that, when executed by a processor, cause the processor to perform operations including: controlling a serving radio transceiver to serve wireless network traffic in a wireless network within a service channel having a bandwidth; controlling a monitor radio receiver to receive energy in a frequency band; control tuning of the monitor radio receiver so that the service channel of the service radio transceiver occupies one of multiple sub-channels within a bandwidth of a frequency band coverage of the monitor radio receiver, the monitor radio receiver filtering a received signal with a filter to produce a filtered received signal that is converted to received digital data; digitally downconvert the received digital data to baseband to provide baseband digital data free of any DC leakage associated with a local oscillator of the monitor radio receiver; and determining whether radar is present in the service channel based on the baseband digital data.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
serving wireless network traffic in a wireless network with a service radio transceiver operating within a service channel having a bandwidth;
receiving energy with a monitor radio receiver;

downconverting the received energy with a first local oscillator signal at a center frequency of a frequency channel plus a frequency offset value to produce a first received signal;
downconverting the received energy with a second local oscillator signal at the center frequency of the frequency channel minus the frequency offset value to produce a second received signal;
converting the first received signal to first digital data comprising first frequency bins;
converting the second received signal to second digital data comprising second frequency bins;
aligning the first frequency bins and the second frequency bins so that a first center frequency bin at the center frequency is aligned with a second center frequency bin at the center frequency; and
determining whether radar is present in the service channel based on a determination whether radar is present in corresponding frequency bins of the first digital data and the second digital data.

2. The method of claim 1, wherein the bandwidth of a frequency band coverage of the monitor radio receiver is at least twice the bandwidth of the service radio transceiver.

3. The method of claim 1, and further comprising controlling the service radio transceiver based on the determining.

4. The method of claim 1, further comprising:
filtering the received energy with a passband filter having a passband corresponding to the bandwidth of the service channel;
filtering the received energy with a low pass filter so that the downconverting is performed on a desired frequency bandwidth portion for converting to digital data for subsequent digital low pass filtering; or
filtering the received energy with a low pass filter so that the downconverting is performed on the desired frequency bandwidth portion for converting to digital data and subsequent digital bandpass filtering of the digital data.

5. The method of claim 1,
wherein determining comprises:
evaluating a first signal level in the first frequency bins to determine if radar is present in any frequency bin of the first received signal;
evaluating a second signal level in the second frequency bins to determine if radar is present in any frequency bin of the second received signal; and
generating an indication that radar is present in the service channel when one or more corresponding frequency bins of the first received signal and the second received signal are determined to have a signal level indicative of presence of radar.

6. The method of claim 5, further comprising, prior to the determining that radar is present in the frequency channel:
from the first frequency bins, selecting a first radar frequency bin corresponding to DC minus the frequency offset value to indicate radar detection; and
from the second frequency bins, selecting a second radar frequency bin corresponding to DC plus the frequency offset value to indicate radar detection.

7. The method of claim 5, wherein evaluating the first signal level includes setting an indicator to positive for a given frequency bin of the first frequency bins when the first signal level in the given frequency bin of the first frequency bins is greater than a threshold, and wherein evaluating the second signal level includes setting the indicator to positive for a given frequency bin of the second frequency bins when the second signal level in the given frequency bin of the second frequency bins is greater than the threshold.

8. The method of claim 7, wherein generating the indication that radar is present includes performing a logical AND operation of indicators for corresponding frequency bins of the first frequency bins and the second frequency bins.

9. The method of claim 5, further comprising controlling the monitor radio receiver so that the service channel of the service radio transceiver occupies one of multiple sub-channels within a bandwidth of a frequency band coverage of the monitor radio receiver, wherein the bandwidth of the frequency band coverage of the monitor radio receiver is equal to at least the bandwidth of the service radio transceiver plus twice the frequency offset value.

10. An apparatus comprising:
a service radio transceiver configured to operate within a service channel having a bandwidth in order to serve wireless network traffic in a wireless network;
a monitor radio receiver configured to:
receive energy in a frequency band;
downconvert the received energy with a first local oscillator signal at a center frequency of a frequency channel plus a frequency offset value to produce a first received signal; and
downconvert the received energy with a second local oscillator at the center frequency of the frequency channel minus the frequency offset value to produce a second received signal;
a first analog-to-digital converter configured to convert the first received signal to first digital data comprising first frequency bins;
a second analog-to-digital converter configured to convert the second received signal to second digital data comprising second frequency bins; and
a control processor coupled to the service radio transceiver and the monitor radio receiver, wherein the control processor is configured to:
align the first frequency bins and the second frequency bins so that a first center frequency bin at the center frequency is aligned with a second center frequency bin at the center frequency; and
determine whether radar is present in the service channel based on a determination whether radar is present in corresponding frequency bins of the first digital data and the second digital data.

11. The apparatus of claim 10, wherein a bandwidth of a frequency band coverage of the monitor radio receiver is at least twice the bandwidth of the service radio transceiver or equal to at least the bandwidth of the service radio transceiver plus twice the frequency offset value.

12. The apparatus of claim 10, wherein the control processor is configured to control the service radio transceiver based on a determination of whether radar is present in the service channel.

13. The apparatus of claim 10, further comprising a passband filter having a passband corresponding to the bandwidth of the service channel or a low pass filter.

14. The apparatus of claim 10, wherein the control processor is configured to determine whether radar is present by:
evaluating a first signal level in the first frequency bins to determine if radar is present in any frequency bin of the first received signal;
evaluating a second signal level in the second frequency bins to determine if radar is present in any frequency bin of the second received signal; and generating an indication that radar is present in the service channel when one or more corresponding frequency bins of the first received signal and the second received signal are determined to have a signal level indicative of presence of radar.

15. The apparatus of claim 14, wherein the control processor is configured to, prior to determining that radar is present in the frequency channel:
from the first frequency bins, select a first radar frequency bin corresponding to DC minus the frequency offset value to indicate radar detection; and
from the second frequency bins, select a second radar frequency bin corresponding to DC plus the frequency offset value to indicate radar detection.

16. The apparatus of claim 14, wherein the control processor is configured to set an indicator to positive for a given frequency bin of the first frequency bins when the first signal level in the given frequency bin of the first frequency bins is greater than a threshold, and to set the indicator to positive for a given frequency bin of the second frequency bins when the second signal level in the given frequency bin of the second frequency bins is greater than the threshold.

17. The apparatus of claim 16, wherein the control processor is configured to generate the indication that radar is present includes performing a logical AND operation of indicators for corresponding frequency bins of the first frequency bins and the second frequency bins.

18. One or more non-transitory computer readable storage media encoded with instructions that, when executed by a processor, cause the processor to perform operations including:
controlling a service radio transceiver to serve wireless network traffic in a wireless network within a service channel having a bandwidth;
controlling a monitor radio receiver to:
receive energy in a frequency band;
downconvert the received energy with a first local oscillator signal at a center frequency of a frequency channel plus a frequency offset value to produce a first received signal; and
downconvert the received energy with a second local oscillator at the center frequency of the frequency channel minus the frequency offset value to produce a second received signal;
controlling tuning of the monitor radio receiver so that the service channel of the service radio transceiver occupies one of multiple sub-channels within a bandwidth of a frequency band coverage of the monitor radio receiver
converting the first received signal to first digital data comprising first frequency bins;
converting the second received signal to second digital data comprising second frequency bins;
aligning the first frequency bins and the second frequency bins so that a first center frequency bin at the center frequency is aligned with a second center frequency bin at the center frequency; and
determining whether radar is present in the service channel based on a determination whether radar is present in corresponding frequency bins of the first digital data and the second digital data.

19. The one or more non-transitory computer readable storage media of claim 18, further comprising instructions operable for controlling the service radio transceiver based on the determining.

20. The one or more non-transitory computer readable storage media of claim 18, wherein a bandwidth of a frequency band coverage of the monitor radio receiver is at least twice the bandwidth of the service radio transceiver or equal to at least the bandwidth of the service radio transceiver plus twice the frequency offset value.

* * * * *